United States Patent
Trainin et al.

(10) Patent No.: US 8,654,748 B2
(45) Date of Patent: Feb. 18, 2014

(54) ACCESS POINT AND METHOD FOR AGGREGATE MPDU (A-MPDU) AND POWER-SAVE MULTI-POLL (PSMP) OPERATION

(75) Inventors: Solomon Trainin, Haifa (IL); Oren Kaidar, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 13/362,239

(22) Filed: Jan. 31, 2012

(65) Prior Publication Data

US 2012/0127982 A1     May 24, 2012

Related U.S. Application Data

(63) Continuation of application No. 11/390,564, filed on Mar. 28, 2006, now Pat. No. 8,125,941.

(51) Int. Cl.
*H04W 4/00* (2009.01)

(52) U.S. Cl.
USPC .......................................... 370/338; 370/477

(58) Field of Classification Search
USPC ......... 370/328, 229, 203, 294, 310, 331, 335, 370/338, 342, 445, 474, 477, 449, 469, 236, 370/350; 375/347; 455/343.4
See application file for complete search history.

(56) References Cited

U.S. PATENT DOCUMENTS

| | | | |
|---|---|---|---|
| 6,977,944 B2 | 12/2005 | Brockmann et al. | |
| 2002/0049049 A1* | 4/2002 | Sandahl et al. | 455/414 |
| 2003/0043744 A1 | 3/2003 | Lu et al. | |
| 2003/0133469 A1* | 7/2003 | Brockmann et al. | 370/445 |
| 2004/0190472 A1 | 9/2004 | Dunn et al. | |
| 2004/0203834 A1* | 10/2004 | Mahany | 455/453 |
| 2005/0053170 A1 | 3/2005 | Catreux | |
| 2005/0195858 A1 | 9/2005 | Nishibayashi et al. | |
| 2006/0092871 A1* | 5/2006 | Nishibayashi et al. | 370/328 |
| 2006/0209667 A1 | 9/2006 | Li | |
| 2007/0161364 A1* | 7/2007 | Surineni et al. | 455/343.4 |
| 2007/0171858 A1* | 7/2007 | Grandhi et al. | 370/328 |
| 2007/0195813 A1 | 8/2007 | Lin | |
| 2007/0230408 A1 | 10/2007 | Trainin et al. | |
| 2008/0159205 A1* | 7/2008 | Sekiya et al. | 370/328 |

FOREIGN PATENT DOCUMENTS

WO    WO-2007112227 A1    10/2007

OTHER PUBLICATIONS

"U.S. Appl. No. 11/390,564, Final Office Action mailed Apr. 28, 2011", 21 pgs.
"U.S. Appl. No. 11/390,564, Non Final Office Action mailed Apr. 30, 2009", 13 pgs.

(Continued)

*Primary Examiner* — Charles Appiah
*Assistant Examiner* — Alexander Yi
(74) *Attorney, Agent, or Firm* — Schwegman, Lundberg & Woessner, P.A.

(57) ABSTRACT

Embodiments of wireless devices and methods for aggregate MPDU (A-MPDU) communications in an IEEE 802.11n network are generally described herein. Two or more A-MPDU subframes are aggregated to form an A-MPDU. In some embodiments, an access point (AP) that is configured for power-save multi-poll (PSMP) operation transmits a PSMP burst comprising a PSMP sequence of two or more A-MPDUs to a plurality of mobile stations (STA) during a downlink phase of the PSMP sequence. During PSMP operation, the AP is to receive a PSMP sequence of two or more A-MPDUs from the STAs during an uplink phase of the PSMP sequence.

16 Claims, 4 Drawing Sheets

(56) References Cited

OTHER PUBLICATIONS

"U.S. Appl. No. 11/390,564, Non-Final Office Action mailed Sep. 17, 2010", 26 pgs.
"U.S. Appl. No. 11/390,564, Non-Final Office Action mailed Oct. 7, 2008", 15 pgs.
"U.S. Appl. No. 11/390,564, Notice of Allowance mailed Oct. 19, 2011", 14 pgs.
"U.S. Appl. No. 11/390,564, Response filed Jan. 6, 2009 to Non-Final Office Action mailed Oct. 7, 2008", 15 pgs.
"U.S. Appl. No. 11/390,564, Response filed Feb. 15, 2011 to Non Final Office Action mailed Sep. 17, 2010", 11 pgs.
"U.S. Appl. No. 11/390,564, Response filed Jul. 23, 2009 to Non Final Office Action mailed Apr. 30, 2009", 11 pgs.
"U.S. Appl. No. 11/390,564, Response filed Jul. 27, 2011 to Final Office Action mailed Apr. 28, 2011", 11 pgs.
"PCT Application Serial No. PCT/US2007/064290, International Search Report mailed Aug. 30, 2007", 3 pgs.
"PCT Application Serial No. PCT/US2007/064290, Written Opinion mailed Aug. 30, 2007", 5 pgs.

* cited by examiner

BIDIRECTIONAL MULTIPLE RECEIVER AGGREGATE SEQUENCE

ALTERNATE DOWNLINK SEQUENCE

US 8,654,748 B2

ACCESS POINT AND METHOD FOR AGGREGATE MPDU (A-MPDU) AND POWER-SAVE MULTI-POLL (PSMP) OPERATION

This application is a continuation of U.S. patent application Ser. No. 11/390,564, filed on Mar. 28, 2006, now issued as U.S. Pat. No. 8,125,941, which is incorporated herein by reference in its entirety.

TECHNICAL FIELD

Some embodiments of the present invention pertain to wireless communication networks. Some embodiments of the present invention relate to the communication of voice traffic over wireless networks.

BACKGROUND

The communication of multiple streams of voice traffic over packet-based wireless networks generally involves the communication of smaller packets with tighter latency requirements than the communication of other types of traffic, such as background and best-effort traffic. One issue with conventional wireless networks is that acknowledgements for frames of voice packets for each stream are performed outside of the burst sequence. This frame acknowledgement process consumes significant additional bandwidth, especially when several voice streams are being communicated by one access point or base station. As a consequence, the bandwidth available for other types of traffic is reduced.

Thus, there are general needs for systems and methods for the communication of multiple voice streams in a wireless network that utilize less bandwidth.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
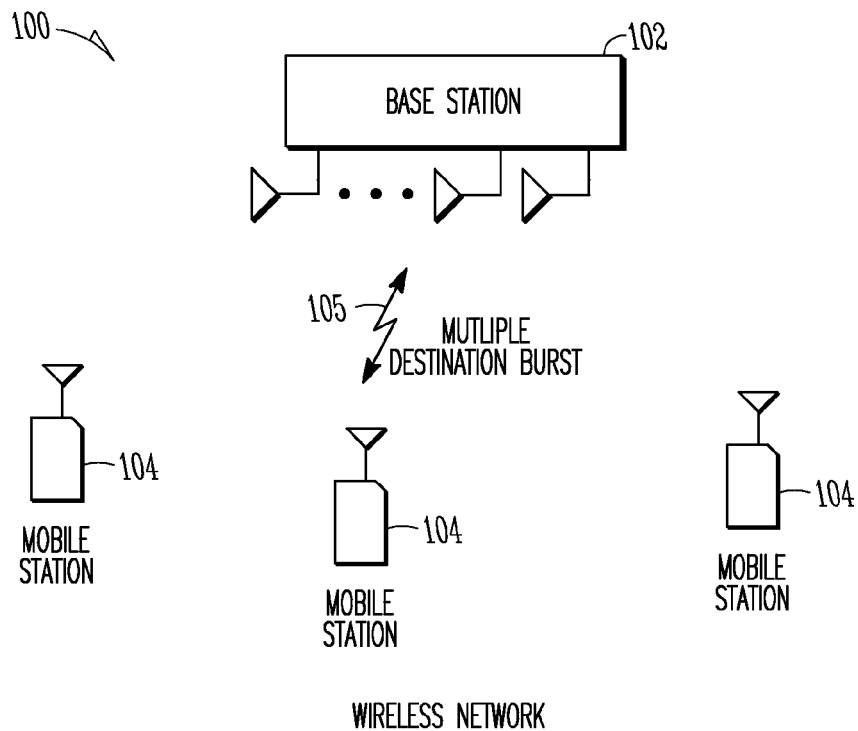
FIG. 1 illustrates a wireless network in accordance with some embodiments of the present invention.

FIG. 1 illustrates a wireless network in accordance with some embodiments of the present invention. Wireless network 100 includes base station 102 and one or more mobile stations 104. Base station 102 may associate with and communicate with each of mobile stations 104 allowing mobile stations 104 to communicate with other networks, such as the Internet, as well as to communicate with each other. Base station 102 and mobile stations 104 may be part of a base station service set (BSS) cell which uses one or more sets of frequency channels that may be selected so as not to interfere with the frequency channels used by other nearby base stations. In some embodiments, base station 102 and mobile stations 104 may be part of a BSS cell in accordance with the communication standards referenced below, although the scope of the invention is not limited in this respect.

In accordance with some embodiments of the present invention, base station 102 may communicate multiple streams of voice traffic with one or more of mobile stations 104 using a bidirectional multiple receiver aggregation (BMRA) sequence allowing multiple voice calls to be supported in parallel with other types of traffic, such as background and best effort traffic. The BMRA sequence may include multiple destination burst 105 for bi-directional communications with mobile stations 104. In these embodiments, the BMRA sequence includes a downlink sequence of data units individually addressed to one or more of mobile stations 104. The data units may include voice traffic aggregated with other traffic. The data units may also include a duration field to indicate the remaining transmission opportunity time remaining in the sequence. In these embodiments, the BMRA sequence may include an uplink sequence of data units with piggyback acknowledgements. The data units of both uplink and downlink sequences, as well as any acknowledge frames, may include a duration field to indicate the remaining transmission opportunity time remaining in the sequence. These embodiments are discussed in more detail below.

In accordance with some embodiments, to initiate the BMRA sequence, base station 102 may use a clear-to-send (CTS) to self transmission to help prevent collisions with a mapping frame, which may be used to indicate timing parameters associated with the BMRA sequence to mobile stations 104. These embodiments are also discussed in more detail below. In some embodiments, wireless network may be a wireless fidelity (WiFi) network and the BMRA sequence may be used to communicate time-sensitive applications, such as voice over wireless fidelity (VoWiFi) or video over WiFi, although the scope of the invention is not limited in this respect.

In some embodiments, the use of the BMRA sequence may allow the communication of multiple voice streams with decreased voice jitter. In some embodiments, the use of the BMRA sequence may allow increased bandwidth for other types of traffic, and may allow mobile stations 104 to reduce power consumption. These embodiments are also discussed in more detail below.

In some embodiments, base station 102 and mobile stations 104 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, base station 102 and mobile stations 104 may communicate using spread-spectrum signals, although the scope of the invention is not limited in this respect.

In some embodiments, base station 102 may be a communication station, such as wireless local area network (WLAN) communication station including a WiFi communication station, or an access point (AP). In some embodiments, each of mobile stations 104 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals used by base station 102 and mobile stations 104 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some embodiments, the frequency spectrum for the communication signals may comprise frequencies between 2 and 11 GHz, although the scope of the invention is not limited in this respect.

In some embodiments, base station 102 and mobile stations 104 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, although the scope of the invention is not limited in this respect as they may also be suitable to transmit and/or receive communications in accordance with other techniques and standards. Some embodiments may relate to the IEEE 802.11 Task Group N (TGn) proposal, and the home technology integration (HTI) specification. For more information with respect to the IEEE 802.11 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999" and related amendments/versions. Some embodiments relate to the IEEE 802.11e proposed enhancement to the IEEE 802.11 WLAN specification that will include quality-of-service (QoS) features, including the prioritization of data, voice, and video transmissions. In some embodiments, base station 102 and mobile stations 104 may use about a 20 megahertz (MHz) bandwidth, while in some high-throughput embodiments, about a 40 MHz bandwidth may be used. Other bandwidths may also be utilized by base station 102 and mobile stations 104.

Figure 2:
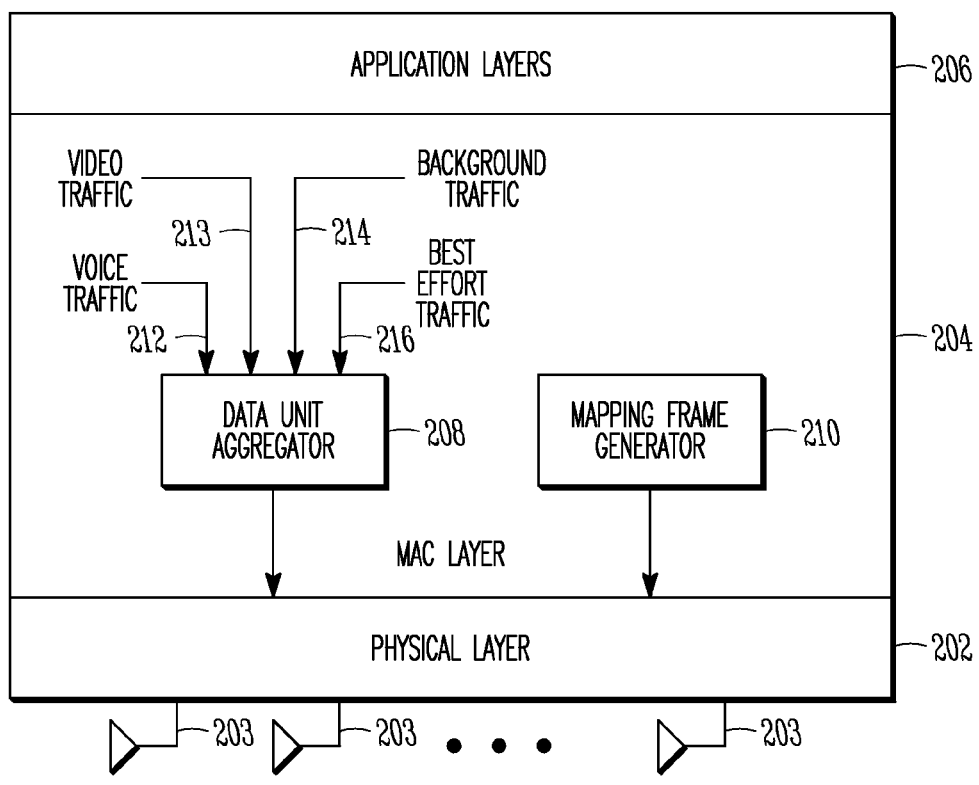
FIG. 2 is a block diagram of a base station in accordance with some embodiments of the present invention.

FIG. 2 is a block diagram of a base station in accordance with some embodiments of the present invention. Base station 200 may be suitable for use as base station 102 (FIG. 1) and may include physical layer 202, media-access control (MAC) layer 204, and one or more other layers including one or more application layers 206. Antennas 203 may be used to receive and/or transmit radio-frequency (RF) communication signals with mobile stations 104 (FIG. 1). Physical layer 202 may convert bit streams from MAC layer 204 to RF signals for transmission by antennas 203, and may convert received RF signals to bit streams for MAC layer 204. Application layer(s) 206 may provide traffic to and from one or more applications to MAC layer 204, including voice traffic 212, video traffic 213, background traffic 214 and/or best effort traffic 216.

In accordance with some embodiments, MAC layer 204 may include data unit aggregator 208 to aggregate traffic and generate data units, including aggregated data units, for the BMRA sequence. MAC layer 204 may also include mapping frame generator 210 to generate the mapping frame which may be used to indicate timing parameters associated with the BMRA sequence. The operations of physical layer 202 and MAC layer 204 are discussed in more detail below.

Although base station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 200 may refer to one or more processes operating on one or more processing elements.

Antennas 203 may comprise one or more directional or omnidirectional antennas, including, for example, dipole antennas, monopole antennas, patch antennas, loop antennas, microstrip antennas or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of antennas 203 and another wireless communication device. In some embodiments, antennas 203 may be separated by up to $\frac{1}{10}$ of a wavelength or more, although the scope of the invention is not limited in this respect.

Figure 3A:
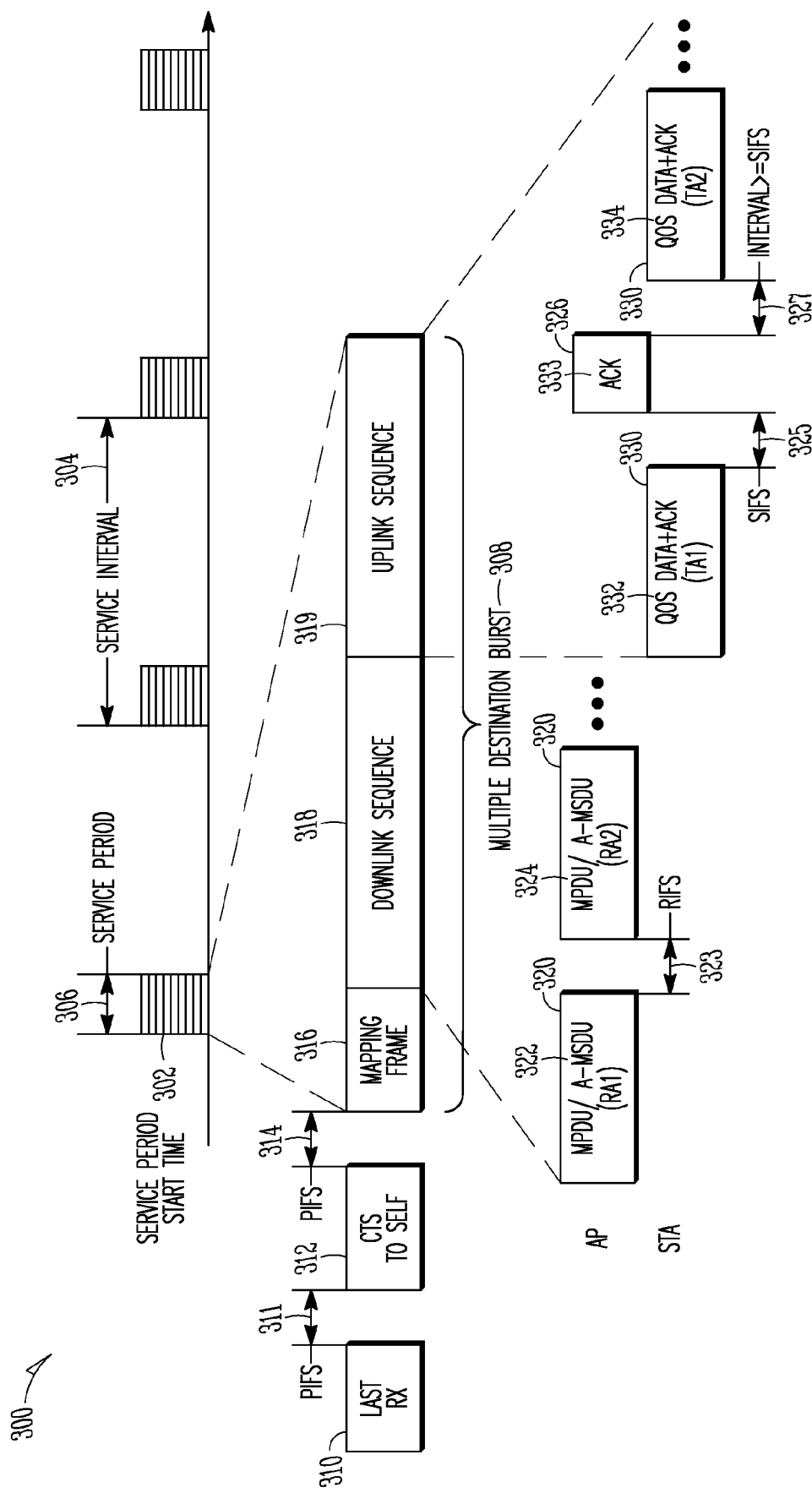
FIG. 3A illustrates a bidirectional multiple receiver aggregate (BMRA) sequence in accordance with some embodiments of the present invention.

FIG. 3A illustrates a bidirectional multiple receiver aggregate (BMRA) sequence in accordance with some embodiments of the present invention. BMRA sequence 300 may be used by a wireless communication device, such as base station 102 (FIG. 1) to communicate with multiple mobile stations, such as mobile stations 104 (FIG. 1). In some embodiments, BMRA sequence 300 may be used to communicate multiple voice streams along with other types of traffic. BMRA sequence 300 may include CTS to self transmission 312 and multiple destination burst 308. Multiple destination burst 308 may begin at service period start time 302, may be repeated every service interval 304, and may be communicated during service period 306 as illustrated. Multiple destination burst 308 may correspond to multiple destination burst 105 (FIG. 1).

Multiple destination burst 308 may include mapping frame 316 followed by downlink sequence 318 and uplink sequence 319. Downlink sequence 318 may include downlink aggregated data units 320 which may be transmitted by base station 102 (FIG. 1). Uplink sequence 319 may include uplink frames 330, which may be transmitted by individual mobile stations 104 (FIG. 1), and acknowledge (ACK) frames 326, which may be transmitted by base station 102 (FIG. 1). In some embodiments, mapping frame 316 may be either a multi-receiver multi-poll (MMP) mapping frame or a power-save multi-poll (PSMP) mapping frame, although the scope of the invention is not limited in these respects.

Referring to FIGS. 1, 2, and 3A, in some embodiments, the use of BMRA sequence 300 may provide for the communication of multiple streams of voice traffic 212 and/or video traffic 213 within a wireless network. As part of a multiple destination burst 308, aggregated voice traffic may be transmitted to a plurality of associated mobile stations 104, and acknowledge frames 326 may be transmitted to mobile stations within a sequence of uplink frames 330 that may be received from mobile stations 104 as part of multiple destination burst 308.

In some embodiments, mapping frame 316 may indicate to associated mobile stations 104 timing parameters associated with multiple destination burst 308. Downlink aggregated data units 320 may include aggregated data units of time-sensitive traffic such as voice traffic 212 and/or video traffic 213. Uplink frames 330 may be received from associated mobile stations 104 and may include a piggyback acknowledgement to acknowledge successful receipt of an associated one of downlink aggregated data units 320. Acknowledge frames 326 may be transmitted to each mobile station 104 after successful receipt of each uplink frame 330 prior to receipt of a next uplink frame 330. Acknowledgment frames 326 may acknowledge successful receipt of an associated uplink frame 330.

In some embodiments, downlink aggregated data units 320 may include best effort traffic 216 and/or background traffic 214 aggregated with voice traffic 212 and/or video traffic 213. Each of the downlink aggregated data units 320 may be associated with one of mobile stations 104. As illustrated in FIG. 3A, each downlink aggregated data unit 320 of downlink sequence 318 may have a receiver address (RA) associated with one of the mobile stations. For example, individual downlink aggregated data unit 322 may have a first receiver address (RA1) for a first mobile station, and individual downlink aggregated data unit 324 may have a second receive address (RA2) for a second mobile station. Additional downlink aggregated data units 320 for additional mobile stations 104 (FIG. 1) may also be included as part of downlink sequence 318.

Although downlink aggregated data units 320 are referred to as aggregated data units, the scope of the invention is not limited in this respect as there is no requirement that downlink aggregated data units 320 include aggregated frames. In some embodiments, downlink aggregated data units 320 may include voice traffic that is not aggregated with other traffic. In some embodiments, downlink aggregated data units 320 may include a MAC protocol data unit (MPDU), a MAC service data unit (MSDU), an aggregated MPDU (A-MPDU), an aggregated MSDU (A-MSDU), and/or a MAC management protocol data unit (MMPDU), although the scope of the invention is not limited in this respect.

In some of these embodiments, multiple voice streams may be viewed as multiple calls that may be concurrently communicated with several associated mobile stations 104 along with other traffic. Each associated mobile station 104 may, for example, receive a separate voice stream from base station 102 allowing base station 102 to communicate multiple voice streams in parallel.

In some embodiments, mapping frame 316, downlink aggregated data units 320, uplink frames 330, and acknowledge frames 326 comprise the multiple destination burst 308. Prior to transmitting mapping frame 316, base station 102 may transmit CTS to self transmission 312 to help prevent collisions with the subsequently transmitted mapping frame 316. CTS to self transmission 312 may initialize and/or establish a network allocation vector (NAV) of receiving wireless communication devices. In some embodiments, CTS to self transmission 312 may also instruct associated mobile stations 104, as well as any other wireless communication devices within a BSS cell, to set their network allocation vector so that these wireless communication devices refrain from transmitting during mapping frame 316, although the scope of the invention is not limited in this respect. In these embodiments, CTS to self transmission 312 may be a frame that is transmitted by base station 102 to protect mapping frame 316 from collisions. Conventional request-to-send/clear-to-send (RTS/CTS) techniques may not be suitable for use with BMRA sequence 300 because multiple destination burst 308 may be a multicast transmission addressed to one or more mobile stations 104.

In some embodiments, the timing parameters within the mapping frame 316 may include downlink and uplink offsets with respect to a service start time 302 for an associated one of mobile stations 104. In accordance with some embodiments, downlink aggregated data units 320 may be transmitted at times indicated by mapping frame 316 and may be separated by reduced interframe spacing (RIFS) 323. Uplink frames 330 and their associated Acknowledge frames 326 may be separated by short interframe spacing (SIFS) 325, and Acknowledge frames 326 may be separated from next uplink frame 334 by at least SIFS 327, although the scope of the invention is not limited in this respect. Mapping frame 316 and the CTS to self transmission 312 may be separated by point coordination function (PCF) interframe spacing (PIFS) 314, although the scope of the invention is not limited in this respect. In some embodiments, PIFS 311 may separate last transmission (LAST RX) 310 from CTS to self transmission 312, although the scope of the invention is not limited in this respect.

In some embodiments, RIFS 323 may be a minimal amount of time to distinguish between sequent frames allowing an overhead burst within the downlink. In some embodiments, RIFS 323 may be about 2 microseconds (µS), although the scope of the invention is not limited in this respect. SIFS 325 may be a minimal time for transmissions between base station 102 and one of mobile stations 104 which may allow ACK frames 326 to be part of uplink sequence 319. PIFS 314 may be a minimal amount of time to allow physical layer 202 to sense the physical medium after CTS to self transmission 312 so that mapping frame 316 will not interfere with another frame that was already transmitted over the medium. In this way, base station 102 may avoid transmitting BMRA sequence 300 when it may result in a collision and is therefore wasted.

In some embodiments, uplink frames 330 may include QoS data and a piggyback ACK and may be addressed with a transmitter address (i.e., TA1, TA2) to indicate the address of the transmitter. In the example of FIG. 3A, TA1 may correspond to a first mobile station, and TA2 may correspond to a second mobile station. The QoS data may include voice traffic or other QoS data, although the scope of the invention is not limited in this respect as non-QoS data may be communicated in uplink frames 330 and/or management frames.

In some embodiments, downlink aggregated data units 320 and Acknowledge frames 326 may each include a duration field to indicate a remaining transmission opportunity (TxOp) time of multiple destination burst 308. The use of the duration field to indicate the remaining TxOp time may help prevent other wireless devices from transmitting during multiple destination burst 308, which may be particularly important when a wireless device did not receive the CTS to self transmission 312 and only receives an acknowledgement frame or a data frame.

In some power-saving embodiments, at least some of the associated mobile stations 104 may transition from a lower-power state to a higher-power state (i.e., wake up) at service period start time 302 to synchronize with and receive mapping frame 316. At least some of mobile stations 104 may return to the lower-power state (i.e., go to sleep) after processing mapping frame 316 until a time associated with receipt of one of aggregated data units 320 based on offsets indicated in mapping frame 316. In these embodiments, mobile stations 104 may return to a lower-power state until a time associated with a transmission of one of uplink frames 330 based on the offsets indicated in mapping frame 316. In these power-saving embodiments, the lower-power state may be viewed as a sleep mode, and the transition to the higher-power state may be viewed as waking up, although the scope of the invention is not limited in this respect. In these power-saving embodiments, a mobile station may sleep during portions of multiple destination burst 308 that are not relevant to the mobile station. For example, explain a second mobile station having receiving address RA2 may sleep during downlink aggregated data unit 322, may be awake during downlink aggregated data unit 324 to receive downlink aggregated data unit 324, and may sleep during subsequent downlink aggregated data units 320. In this example, the second mobile station may sleep during uplink data frame 332 and associated acknowledge frame 333, and may be awake during uplink data frame 334 and a subsequent acknowledge frame (not shown). In some of these power-saving embodiments, mapping frame 316 may be PSMP mapping frame, although the scope of the invention is not limited in this respect.

In some embodiments, frames of voice packets that were not successfully received during multiple destination burst 308 may be aggregated into downlink aggregated data units of a next multiple destination burst. In accordance with some embodiments, data unit aggregator 208 may generate downlink aggregated data units 320 and mapping frame generator 210 may generate mapping frame 316.

In some MIMO embodiments, multiple destination burst 308 may be transmitted using more than one of antennas 203. In these embodiments, each of antennas 203 may be weighted to compensate, at least in part, for channel characteristics with the associated mobile stations 104.

Figure 3B:
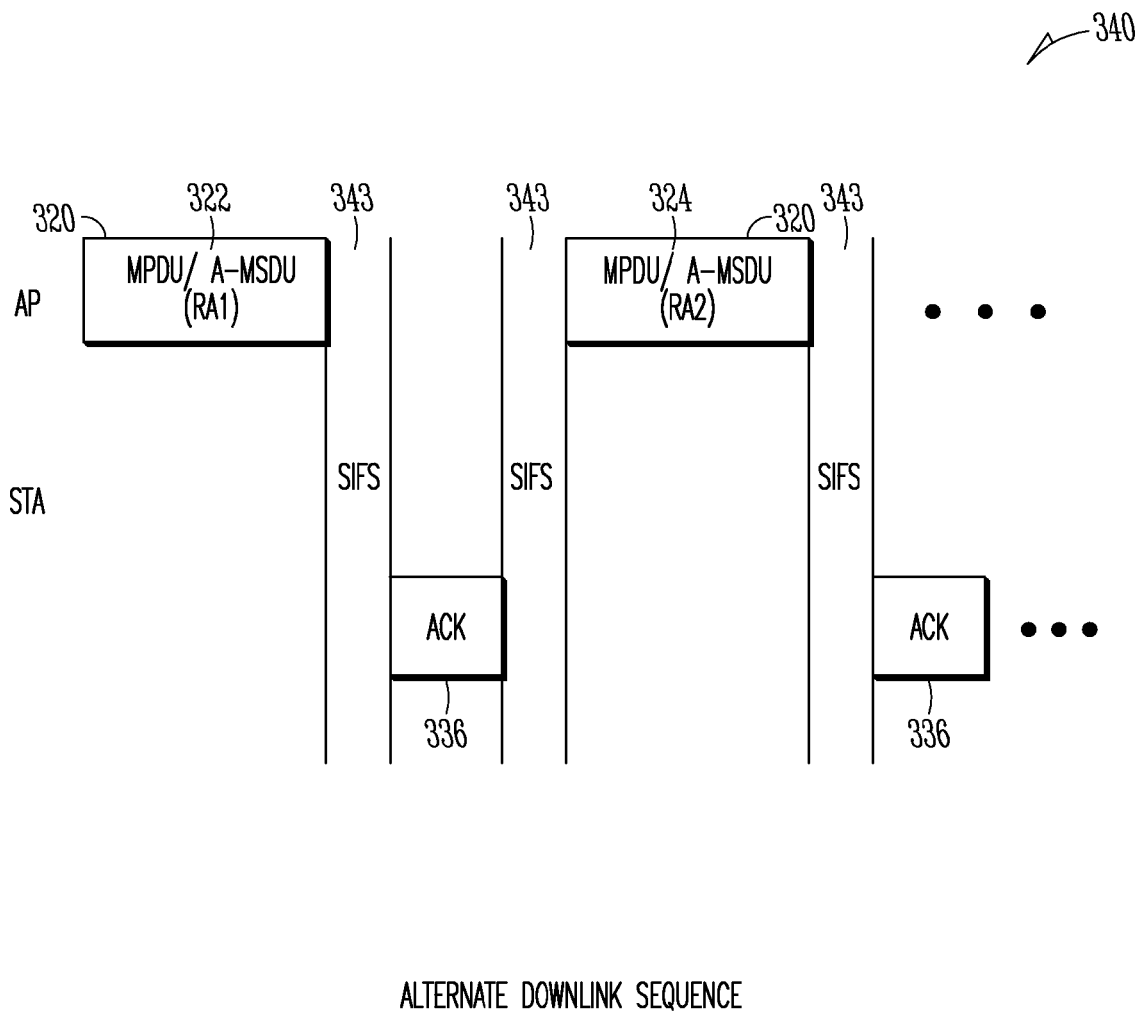
FIG. 3B illustrates a BMRA sequence with an alternate downlink sequence in accordance with some embodiments of the present invention.

FIG. 3B illustrates a BMRA sequence with an alternate downlink sequence in accordance with some embodiments of the present invention. In these embodiments, alternate downlink sequence 340 may be used instead of downlink sequence 318 (FIG. 3A). Alternate downlink sequence 340 includes downlink aggregated data units 320, shown as downlink aggregated data unit 322 and downlink aggregated data unit 324. In FIG. 3B, downlink aggregated data unit 322 and downlink aggregated data unit 324 may correspond respectively to downlink aggregated data unit 322 (FIG. 3A) and downlink aggregated data unit 324 (FIG. 3A). Alternate downlink sequence 340 includes ACK frames 336, which may be transmitted by a mobile station and may immediately follow each downlink aggregated data unit 320 as illustrated. In these embodiments, SIFS 343 may separate ACK frames 336 from downlink aggregated data units 322 and 324, although the scope of the invention is not limited in this respect.

In some of these embodiments, ACK frames 336 may acknowledge all or part of the data in the prior downlink aggregated data unit 320. In embodiments when ACK frames 336 acknowledge all of data in a prior of downlink aggregated data units 320, uplink frames 330 (FIG. 3A) do not need to include a piggyback acknowledgement. In embodiments when ACK frames 336 acknowledge part of the data in a prior of downlink aggregated data units 320, uplink frames 330 (FIG. 3A) may include a piggyback acknowledgement to acknowledge the remaining data. When downlink aggregated data units 320 includes voice traffic, video traffic or other time-sensitive traffic, ACK frames 336 may be included in the downlink sequence to immediately acknowledge at least the portions of downlink aggregated data units 320 that include the voice traffic, video traffic and/or other time-sensitive traffic. In some of these embodiments, mapping frame 316 (FIG. 3A) may indicate whether alternate downlink sequence 340 is to be used instead of downlink sequence 318 (FIG. 3A).

Figure 4:
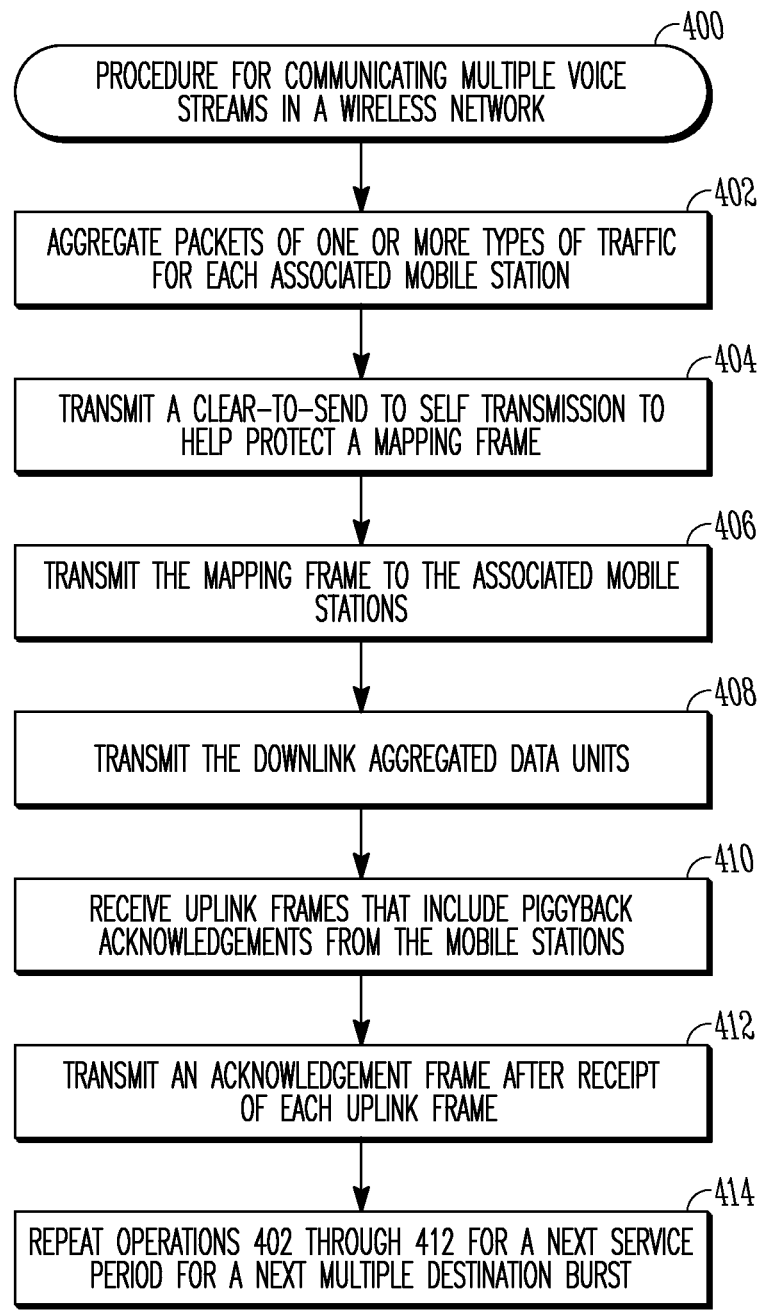
FIG. 4 is a flow chart of a procedure for communicating multiple voice streams in a wireless network in accordance with some embodiments of the present invention.

FIG. 4 is a flow chart of a procedure for communicating multiple voice streams in a wireless network in accordance with some embodiments of the present invention. Procedure 400 may be performed by a wireless communication device, such as base station 102 (FIG. 1), to communicate with one or more mobile stations, such as mobile stations 104 (FIG. 1).

Operation 402 comprises aggregating packets of one or more types of traffic for each associated mobile station. Operation 402 may be performed by data unit aggregator 208 (FIG. 2) and may generate downlink aggregated data units, such as downlink aggregated data units 320 (FIG. 3A). The downlink aggregated data units may include voice traffic aggregated with other types of traffic, although the scope of the invention is not limited in this respect.

Operation 404 comprises transmitting a CTS to self transmission to help protect a mapping frame. The CTS to self transmission may correspond to CTS to self transmission 312 (FIG. 3A).

Operation 406 comprises transmitting a mapping frame to the associated mobile stations. The mapping frame may correspond to mapping frame 316 (FIG. 3A).

Operation 408 comprises transmitting the downlink aggregated data units that may have been aggregated in operation 402. In some embodiments, operation 408 may comprise transmitting downlink aggregated data units 320 (FIG. 3A or FIG. 3B). In some embodiments, operation 408 may also comprise receiving immediate acknowledgements, such as ACK frames 336 (FIG. 3B), to acknowledge part of the data in a prior downlink aggregated data unit.

Operation 410 comprises receiving uplink frames that include piggyback acknowledgements from the mobile stations. The uplink frames may correspond to uplink frames 330 (FIG. 3A).

Operation 412 comprises transmitting an acknowledgement frame after receipt of each uplink frame. The acknowledge frames may be transmitted amongst the sequence of uplink frames and may correspond to acknowledge frames 326 (FIG. 3A). Operations 406 through 412 comprise communicating a multiple destination burst, such as multiple destination burst 308 (FIG. 3A).

Operation 414 comprises repeating operations 402 through 412 for a next service period for a next multiple destination burst. For example, operations 402 through 412 may be repeated for next service interval 304 (FIG. 3A).

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. An access point (AP) configured for power-save multi-poll (PSMP) operation comprising: media-access control (MAC) layer circuitry to aggregate a sequence of two or more medium access control (MAC) protocol data units (MPDUs) to form an aggregate MPDU (A-MPDU); and physical (PHY) layer circuitry to transmit a PSMP burst comprising the A-MPDU in a physical layer convergence procedure (PLCP) service data unit (PSDU) to a plurality of mobile stations (STA) during a downlink phase of a PSMP sequence and to receive a PSMP sequence of two or more A-MPDUs from the STAs during an uplink phase of the PSMP sequence, wherein the MAC layer circuitry is to configure A-MPDUs, wherein each A-MPDU received during the uplink phase includes an acknowledgement (ACK) to acknowledge receipt of an associated one of the A-MPDUs transmitted during the downlink phase, wherein the PHY layer circuitry is further arranged to transmit a plurality of downlink acknowledgements to the mobile stations to acknowledge the A-MPDUs received during the uplink phase of the PSMP sequence, wherein when the AP is functioning as a high-throughput (HT) AP, the MPDUs of the A-MPDU are configurable to have a group-addressed receiver address (RA), and wherein when the AP is not functioning as a high-throughput (HT) AP, the MPDUs of the A-MPDU are configurable to each have a different individual-addressed receiver address (RA) for each of the mobile stations.

2. The access point of claim 1, wherein the sequence of two or more MPDUs comprises a sequence of two or more aggregate MPDU (A-MPDU) subframes.

3. The access point of claim 2 wherein the PHY layer circuitry is configured to transmit a mapping frame prior to the A-MPDU as part of the PSMP burst that includes the mapping frame and the A-MPDU.

4. The access point of claim 2 wherein after transmission of the PSMP burst, the PHY layer circuitry is configured to transmit a clear-to-send (CTS)-to-itself transmission prior to the burst to help prevent collisions with the mapping frame.

5. The access point of claim 4 wherein the PHY layer circuitry is configured to: receive a sequence of uplink frames from the mobile stations after a downlink sequence, each uplink frame optionally including QoS data and including a piggyback acknowledgement to acknowledge receipt of an associated one of the data units of the downlink sequence; and transmit plurality of downlink acknowledge frames to the mobile stations amongst the sequence of received uplink frames, each downlink acknowledge frame to acknowledge receipt of a preceding one of the uplink frames of the sequence, wherein each acknowledge frame of the plurality is transmitted to a mobile station after receipt of an uplink frame of the sequence of uplink frames and prior to receipt of a next uplink frame of the sequence of uplink frames from another mobile station.

6. The access point of claim 5 wherein each uplink frame of the sequence and its associated acknowledge frame are separated by a short interframe spacing (SIFS),
   wherein each acknowledge frame and a next uplink frame of the sequence are separated by a spacing greater than or equal to a SIFS,
   wherein the data units of the downlink sequence are transmitted at times indicated by the mapping frame and are separated by a reduced interframe spacing (RIFS), and
   wherein the mapping frame and the CTS-to-itself transmission are separated by a point coordination function interframe spacing (PIFS).

7. An access point (AP) configured for power-save multi-poll (PSMP) operation, the AP comprising: a physical (PHY) layer to transmit a PSMP burst comprising a PSMP sequence of two or more aggregate medium access control (MAC) protocol data units (MPDUs) (A-MPDUs) to a plurality of mobile stations (STA) during a downlink phase of the PSMP sequence and to receive a PSMP sequence of two or more A-MPDUs from the STAs during an uplink phase of the PSMP sequence; and a MAC layer to configure the A-MPDUs, wherein each A-MPDU received during the uplink phase includes an acknowledgement (ACK) to acknowledge receipt of an associated one of the A-MPDUs transmitted during the downlink phase, wherein the PHY layer is further arranged to transmit a plurality of downlink acknowledgements to the mobile stations to acknowledge the A-MPDUs received during the uplink phase of the PSMP sequence, wherein when the AP is functioning as a high-throughput (HT) AP, the MPDUs of the A-MPDU are configurable to have a group-addressed receiver address (RA), and wherein when the AP is not functioning as a high-throughput (HT) AP, the MPDUs of the A-MPDU are configurable to each have a different individual-addressed receiver address (RA) for each of the mobile stations.

8. The access point of claim 7 wherein the PSMP burst is aligned with a start time of a service period (SP), and wherein the A-MPDUs of the PSMP burst are separated by a short interframe spacing (SIFS).

9. The access point of claim 8 wherein each A-MPDU received during the uplink phase optionally includes quality-of-service (QoS) data.

10. The access point of claim 9 wherein the MAC layer is to aggregate two or more MPDUs to form the A-MPDU.

11. The access point of claim 10 wherein the A-MPDU received from the STAs during the uplink phase are separated by a SIFS.

12. The access point of claim 10 wherein the downlink phase and the uplink phase comprise an initial PSMP sequence of two or more PSMP sequences that comprise the PSMP burst.

13. The access point of claim 12 wherein the PHY layer is further configured to transmit a mapping frame prior to transmission of the PSMP sequence, the mapping frame to indicate to the STAs timing parameters for the PSMP burst.

14. The access point of claim 12 wherein the MAC layer is to generate a PSMP action frame for controlling the PSMP operation, wherein an action field of the PSMP action frame is set for PSMP.

15. A method for power-save multi-poll (PSMP) operation performed by an access point (AP), the method comprising: transmitting, by a physical layer, a PSMP burst comprising a PSMP sequence of two or more aggregate medium access control (MAC) protocol data units (MPDUs) (A-MPDUs) to a plurality of mobile stations (STA) during a downlink phase of the PSMP sequence and to receive a PSMP sequence of two or more A-MPDUs from the STAs during an uplink phase of the PSMP sequence; configuring the A-MPDUs by a MAC layer; and transmitting a plurality of downlink acknowledgements to the mobile stations to acknowledge the A-MPDUs received during the uplink phase of the PSMP sequence, wherein each A-MPDU received during the uplink phase includes an acknowledgement (ACK) to acknowledge receipt of an associated one of the A-MPDUs transmitted during the downlink phase, and wherein when the AP is functioning as a high-throughput (HT) AP, the MPDUs of the A-MPDU are configurable to have a group-addressed receiver address (RA), and wherein when the AP is not functioning as a high-throughput (HT) AP, the MPDUs of the A-MPDU are configurable to each have a different individual-addressed receiver address (RA) for each of the mobile stations.

16. The method of claim 15 further comprising: aligning the PSMP burst with a start time of a service period (SP); and separating the A-MPDUs of the PSMP burst by a short interframe spacing (SIFS).

* * * * *

UNITED STATES PATENT AND TRADEMARK OFFICE
CERTIFICATE OF CORRECTION

| | | |
|---|---|---|
| PATENT NO. | : 8,654,748 B2 | Page 1 of 1 |
| APPLICATION NO. | : 13/362239 | |
| DATED | : February 18, 2014 | |
| INVENTOR(S) | : Trainin et al. | |

It is certified that error appears in the above-identified patent and that said Letters Patent is hereby corrected as shown below:

In the Claims

In column 11, line 6, in Claim 11, delete "A-MPDU" and insert --A-MPDUs--, therefor Signed and Sealed this
Second Day of December, 2014

Michelle K. Lee
*Deputy Director of the United States Patent and Trademark Office*